(12) United States Patent
Budde et al.

(10) Patent No.: US 7,994,723 B2
(45) Date of Patent: Aug. 9, 2011

(54) LIGHTING SYSTEM AND METHOD FOR CONTROLLING A PLURALITY OF LIGHT SOURCES

(75) Inventors: Wolfgang Otto Budde, Aachen (DE); Bozena Erdmann, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 601 days.

(21) Appl. No.: 11/996,599

(22) PCT Filed: Jul. 18, 2006

(86) PCT No.: PCT/IB2006/052459
§ 371 (c)(1), (2), (4) Date: May 21, 2008

(87) PCT Pub. No.: WO2007/013003
PCT Pub. Date: Feb. 1, 2007

(65) Prior Publication Data
US 2008/0231203 A1    Sep. 25, 2008

(30) Foreign Application Priority Data
Jul. 27, 2005 (EP) .................................... 05106933

(51) Int. Cl.
*H05B 39/10* (2006.01)

(52) U.S. Cl. ................................ 315/90; 315/93; 315/88
(58) Field of Classification Search .................... 315/86, 315/88, 93, 119, 125, 127, 185 R, 186, 188, 315/193, 185 S, 209 R, 210, 211, 217, 225, 315/291, 294, 295, 299, 300, 306, 307, 312, 315/313, 315, 316, 322, 362
See application file for complete search history.

(56) References Cited

U.S. PATENT DOCUMENTS

| 5,672,941 A | 9/1997 | Callahan et al. |
| 6,239,716 B1 * | 5/2001 | Pross et al. ................. 340/815.4 |
| 6,297,724 B1 | 10/2001 | Bryans et al. |
| 2003/0057886 A1 | 3/2003 | Lys et al. |

* cited by examiner

*Primary Examiner* — Douglas W Owens
*Assistant Examiner* — Jianzi Chen

(57) ABSTRACT

A lighting system, a lighting unit and a method for controlling a plurality of light sources are described. A lighting system comprises an intelligent electrical current supply 12 to supply an electrical current with modulated command data. A plurality of lighting units 4, 6, 8 are connected in series to the current supply 12. Each lighting unit comprises a light source 22, a controllable bypassing switch 24 to selectively bypass the light source and a control unit 26. The control unit receives the modulated command data and controls the bypassing switch 24 accordingly.

17 Claims, 5 Drawing Sheets

LIGHTING SYSTEM AND METHOD FOR CONTROLLING A PLURALITY OF LIGHT SOURCES

The present invention relates to a lighting system and a method for controlling a plurality of light sources.

In a lighting system, there are multiple light sources, which may be arranged in different locations. The light sources are in some way electrically connected, so that electrical power may be supplied and operation of the light sources may be controlled.

US-A-2003/0057886 describes a networked lighting system. A plurality of LED-based lighting units are arranged, e.g. as a computer controllable "light string". They are connected to a common power supply either serially or in parallel. Each lighting unit comprises a controller for individually controlling LED (or other) light sources. Control data is sent over a data link, and the lighting unit controllers operate the light sources according to the control data, therewith e.g. controlling the light output per LED. LEDs may be driven by PWM to control intensity. The lighting units are arranged serially with respect to the data link. During configuration and operation, a string of data—configuration addresses or operation parameters—is selectively passed on from one unit to the next.

It is the object of the present invention to provide a lighting system allowing flexible control of individual lighting units while keeping outlay low.

This object is achieved by a lighting system according to claim 1, a lighting unit for use in such a system according to claim 6, and a method for controlling a plurality of light sources according to claim 7. Dependent claims relate to preferred embodiments of the invention.

According to the invention, the lighting system comprises an electrical current supply and a system control unit. These may be separate units, but preferably are integrated into one device. A current supply and the control unit together supply an electrical current with modulated command data. The electrical current may be an alternating current, but preferably is a direct current. The current is preferably essentially constant, except for the modulation. The modulated command data is command information directed from the system control unit to the lighting units, which is given in modulated form. Modulation in the present context is understood as any type of varying the carrier (supply current) over time in order to convey information. In the case of a direct current, modulation may comprise pulse modulation, i.e. turning the current on and off consecutively or alternating between different current amplitudes, e.g. 100%/50% of a nominal value. Alternatively, more sophisticated methods of modulation, especially of the current amplitude and, in case of an alternating current, also the frequency or phase, may be employed.

The lighting system according to the invention further comprises a plurality of lighting units, which each have at least one light source, preferably LED. The lighting units are connected to the power supply in series. In the present context this is understood to mean that the units are not all directly connected to the power supply, but are connected one after the other. The supply current during operation passes through each lighting unit, so that the current in each lighting unit is substantially the same (except for a mode of operation where one lighting unit shortcuts other lighting units, which will be explained later).

In each lighting unit, the supply current may drive the light source. In order to control operation of a light source, there are controllable bypassing means provided according to the invention, allowing to selectively bypass the light source. The bypassing means are controlled by a control unit within the lighting unit. The control unit receives the modulated command data and controls the bypassing means accordingly. In this way, the system control unit may supply commands as modulated command data, and the control unit of the appropriate lighting unit(s) will execute a command by either having the light source operated by the supply current, or bypassed.

The inventive lighting system comprises a number of advantages over known systems. Wiring is kept to a minimum in the case of a series connection, so the wiring outlay is kept exceptionally low. No dedicated wires for power and data connection are necessary. Further, an identical current through each lighting unit, as is the case in a series connection, will lead especially in the preferred case of LED light sources, to stable operation and constant light intensity and hue throughout the system.

Instead of only one light source, there may be multiple light sources in each lighting unit. These may be of different color, and the overall color of the light output of such a lighting unit may be adjusted by selectively controlling the different color light sources.

The light sources may be distributed in space, e.g. ordered in a one-dimensional arrangement forming a line, or in a two-dimensional arrangement, e.g. forming a matrix. The ordering is in each case preferred to be one-dimensional due to the series connection; nevertheless, one-dimensional ordering can easily be mapped into two-dimensional structures, e.g. by folding a line into several lines, thereby creating a matrix structure. As will be apparent further on, the series connection may advantageously be used to allow easy configuring of the system, so that each lighting unit may be controlled according to its position in the distribution, allowing for automatic installation.

According to a preferred embodiment of the invention, the bypassing means comprises a bypassing switch connected in parallel to the light source. Multiple light sources on the same lighting unit may comprise one common, or individually separate bypassing switches. If a bypassing switch is open, the light source will operate due to the current flowing through it. In the case of a closed bypassing switch, the lighting unit will not operate.

According to a further preferred embodiment, a control unit comprises a PWM driver unit to control the bypassing means. The bypassing means in this case are operated according to a PWM sequence, i.e. they are activated and deactivated consecutively. For example, if the periods of activation and deactivation of the bypassing means (corresponding to non-operation/operation of the light source) are equal, the total intensity of the light source will be at approx. 50%. If the PWM sequence has high enough frequency (e.g. 400 Hz), the generated light is perceived as constant, but dimmed.

According to a preferred embodiment of the lighting system, each of the lighting units comprises at least three terminals: a current input, a forward current output and a shortcut current output. The lighting units are connected in series by connecting the current input of a second lighting unit to the forward current output of a first lighting unit.

However, within each lighting unit, the forward current output is not directly connected to the current input. Rather, there are switching means provided which may connect the current input selectively either to the forward current output or the shortcut output. This allows each lighting unit in the series connection to operate the switching means to either connect lighting units following in the series connection to the supply current (by activating the forward current output), or to deactivate all following lighting units in the series connection by activating the shortcut current output.

This may advantageously be used to allow each unit to control the flow of information through it. By activating the shortcut current output, the forward current output is deactivated. In the present context, this is understood to mean that all subsequent units no longer receive the full current supply. They may remain un-powered or may alternatively receive a fraction (e.g. ¾ or ½) of the full supply current. Also, if the forward current output is activated, the shortcut current output may still receive a fraction of a current although this is not preferred in terms of energy efficiency. The sum of forward and shortcut current is always constant. The modulation index, i.e. the ratio between reduced forward current and full forward current, may be chosen deliberately: high modulation indices ensure good detectability of modulation, whereas low modulation indices leave subsequent lighting units well powered and avoid large current changes in either direction, thereby minimizing voltage induction and radiation.

As will be discussed, operation of a switching means may advantageously be employed for automatic configuration of the lighting system. The ability of each unit to control the flow of information through it provides an easy way of detecting the ordering of the lighting units within the series connection. During normal operation, however, it is preferred for all lighting units (except for the last unit in the series connection) to fully activate the forward current output.

According to a preferred embodiment of the invention, the control unit comprises a clock device. The clock device serves to supply a clock signal, which may be used to decode the modulated command data. On the other hand, the clock devices of the individual lighting units may be synchronized by a part of the modulated command data, so that the clock signals in the individual lighting units are synchronous to a desired accuracy.

According to the method of claim 7 for controlling a plurality of light sources, an electrical current with modulated command data is supplied as described above. In each of a plurality of lighting units connected in series, controllable bypassing means as discussed are operated according to the command data.

In the preferred case of lighting units with a current input, a forward current output, and a shortcut current output as described above, a configuration step may be initiated by providing modulated command data including a start symbol. This may be any signal sequence in the current supply recognizable as such by the control units of the individual lighting units. These then operate the switching means to connect the current input with the shortcut current output. Consequently, the forward current output is disconnected. Note that the term "disconnected" is here understood to mean that no current or only a fraction of the full current, as described above, is received.

According to a further preferred embodiment, the configuration step comprises associating configuration data (e.g. address data) with each lighting unit consecutively, where after reception of the configuration data, in each lighting unit the switching means is operated to activate the forward current output. In this way, the lighting units are automatically configured in their wiring order. This greatly simplifies installation of a lighting system. During subsequent operation, the lighting units may easily be controlled according to their order, so that lighting patterns may be displayed. Also, the number of lighting units in the system may in this way be determined automatically.

There are different possibilities to convey configuration information, especially address data, to the lighting units. In one embodiment, a clock signal is used, which allows to associate a unique time slot to every lighting unit during the configuration step. A clock signal generated in the lighting unit's control unit is used to sample the incoming current waveform, thereby allowing the control unit to detect the information conveyed with the modulated current. After reception of the start symbol, the input current signal is evaluated with respect to the time slot and the clock signal to determine the address data. Since after reception of the start signal each unit deactivates the forward current output, only the first unit will receive a current signal during the first time slot, yielding a first address. After the address is determined, the first lighting unit activates the forward current output, so that the second lighting unit receives a current signal during the second time slot, and determines a second address. This continues on throughout the system. Thus, preferably equidistant time slots, each associated with the corresponding position in the series connection, are used to determine the address for each lighting unit according to its order in the series connection.

With this configuration method, the control unit of each lighting unit recognizes its place in the wiring order of the lighting units in the line. It may then assume a unique address according to a simple algorithm (e.g. the first lighting unit assumes address 1, a second lighting unit assumes address 2, and so forth). The system control unit on the other hand also associates the first lighting unit with this address, using the same algorithm (this can, however, be done offline, i.e. the system control unit is provided with an a-priori understanding of the relation between lighting unit in the line, and the associated address). Thus, system control unit and lighting unit come to a common understanding of the lighting unit's address without any need to further communicate. The address chosen by the lighting unit is then stored in the control units, so that during subsequent operation the lighting units will operate in accordance with commands directed at the corresponding address. The address data may be unique, so that each unit has a different address. Additionally, address data may be a group address shared by a plurality of lighting units.

According to an alternative embodiment, address data is sent to each lighting unit individually in multiple configuration periods, while already configured lighting units remain passive. Thus, the system control unit communicates with the first lighting unit during said first configuration step (i.e. while all other lighting units are temporarily disconnected), thereby conveying address data to this first unit. This continues on for all other lighting units until the whole system is configured.

During operation, the addresses may be used to convey control commands to individual lighting units.

In the following, embodiments of the present invention are described with reference to the drawings. Like numerals correspond to like parts in all drawings.

Figure 1:
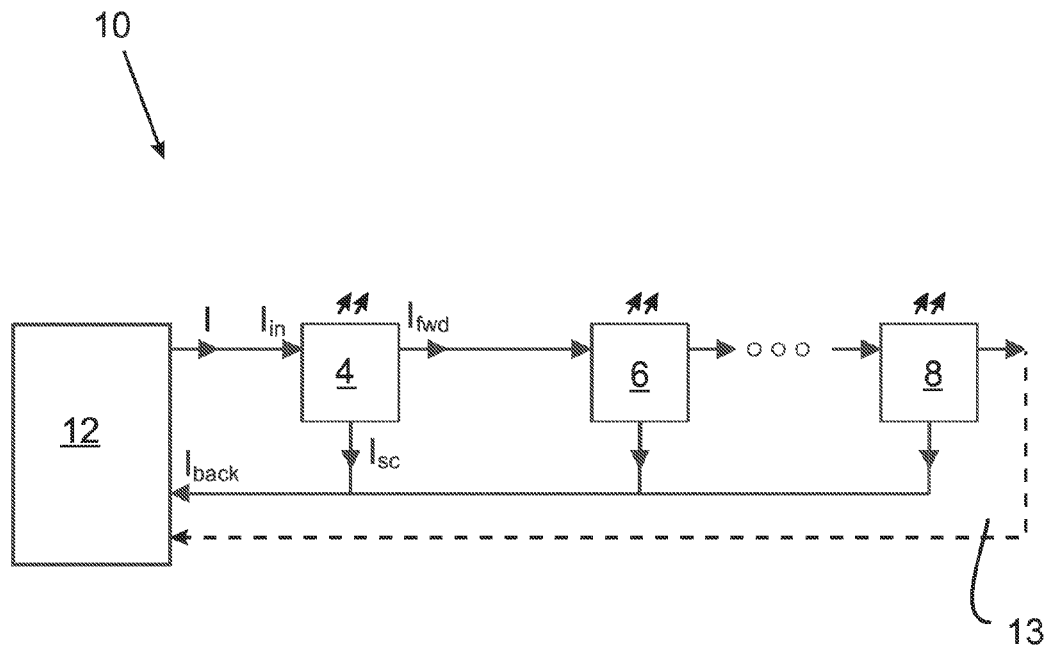
FIG. 1 shows a symbolic circuit diagram of a lighting system.

FIG. 1 shows a lighting system 10 comprising a current supply 12 and a plurality of lighting units 4, 6, 8. The current supply 12 has a current output where an output current I is delivered. At the other terminal, a back current $I_{back}$ is returned, which is generally identical to I.

Each lighting unit 4, 6, 8 has three terminals, a first terminal accepting an input current $I_{in}$, a second terminal delivering a forward output current $I_{fwd}$ and a third terminal delivering a shortcut output current $I_{sc}$. The lighting units (4, 6, 8) are connected to the current supply 12 in a series wired connection. The first LED unit in the row 4 is supplied with current I from the current source 12. The following lighting unit 6 is supplied with the forward output current $I_{fwd}$ of the preceding lighting unit 4 and so on. All shortcut current output terminals are connected to the second terminal of the current source 12 to deliver $I_{back}$.

The last lighting unit in the row 8 may be connected in different ways. As will become apparent, the forward output current terminal of the last unit 8 may be unconnected during operation. However, for the preferred automatic commissioning which will be described below, the forward output current terminal of the last unit 8 may either be connected to the current source 12 via a dedicated cable connection 13 (shown as a slashed line), or to the shortcut current output. This allows that a current I may flow during the commissioning phase as will become apparent below.

Figure 2:
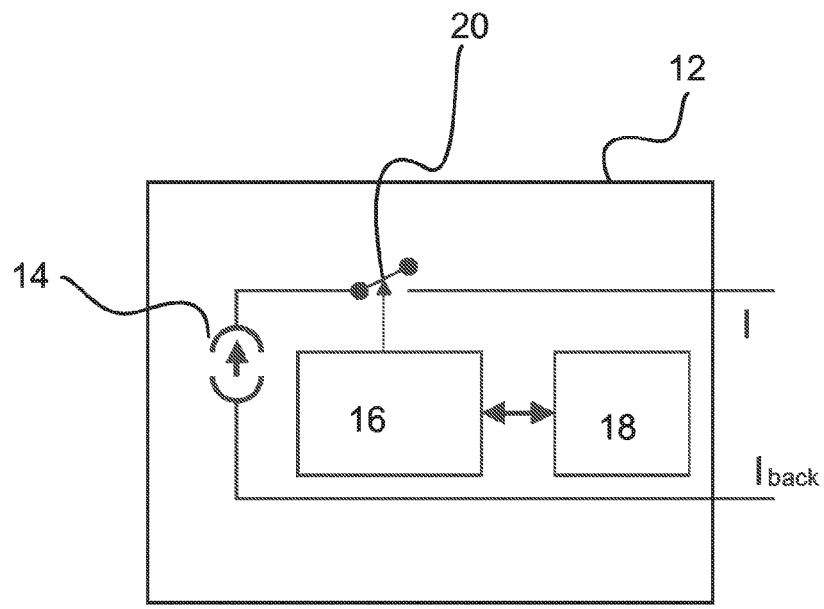
FIG. 2 shows a symbolic circuit diagram of a power supply and system control unit of the lighting system of FIG. 1.

FIG. 2 illustrates current supply 12 in greater detail. The current supply comprises a constant current source 14 delivering a constant current I. In the embodiments shown, current source 14 delivers a direct current. The current source further comprises a current source controller 16 acting as a system control unit accessing a read/write memory 18. The current source controller 16 controls a modulation device, which in the preferred embodiment is shown as a modulation switch 20. As modulation switch 20, controlled by current source controller 16, is consecutively opened and closed, the current I delivered by the current source 12 is modulated. Note that instead of on/off modulation, there are other, more sophisticated forms of modulation possible, as known to the skilled person.

Current source 12 is in the present context termed an "intelligent" current source, because it not only delivers an essentially constant current I (constant amplitude except for the modulation), but also modulated data to control lighting units 4, 6, 8 as will become apparent in the description below.

Figure 3:
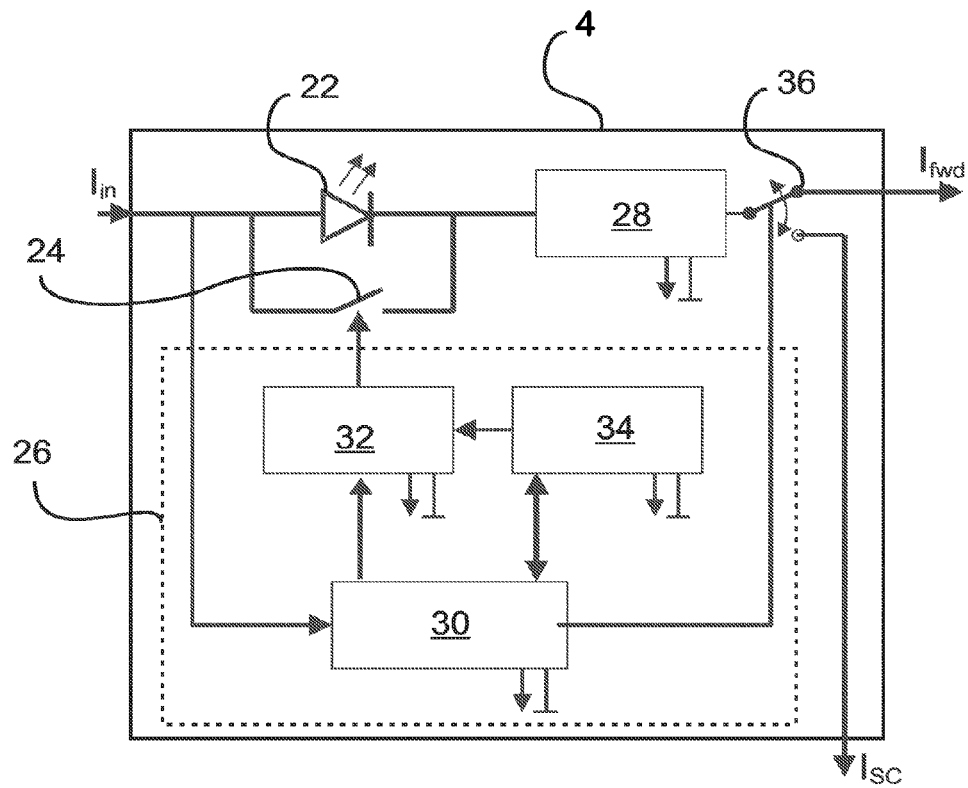
FIG. 3 shows a symbolic circuit diagram of a lighting unit from the system of FIG. 1.

FIG. 3 shows one of the lighting units 4, 6, 8 with the three terminals $I_{in}$, $I_{fwd}$, and $I_{sc}$. Each lighting unit comprises a LED light source 22 connected to $I_{in}$. A bypass switch 24 (e.g. a transistor) is connected parallel to the LED 22. If bypass switch 24 is closed, LED 22 is bypassed by input current $I_{in}$, so that LED 22 will not operate. If bypass switch 24 is open, LED 22 will be operated by current $I_{in}$ flowing through it.

Lighting unit 4, 6, 8 further comprises a control unit 26 and a power converter 28. Power converter 28 is connected in a serial connection to the input current $I_{in}$ and generates from the current flowing through it (e.g. via a low-impedance resistor) an operating voltage for control unit 26 (symbolically shown as a voltage against ground). The required energy for control unit 26 is several orders of magnitude less than the power for operating the light source. It is preferred that the operating voltage is buffered/stored/accumulated (e.g. with a high capacity capacitor), so that control unit 26 will be able to operate for some time even if current I is turned off.

The control unit 26 comprises a main controller 30, a PWM-controller 32 and a clock generator 34. In a preferred embodiment, these may be part of a single integrated circuit.

Main controller 30 receives and evaluates a measurement of the current $I_{in}$. Also, main controller 30 operates a forward/shortcut switch 36, which selectively connects $I_{in}$ to either $I_{fwd}$ or $I_{sc}$.

Figure 4:
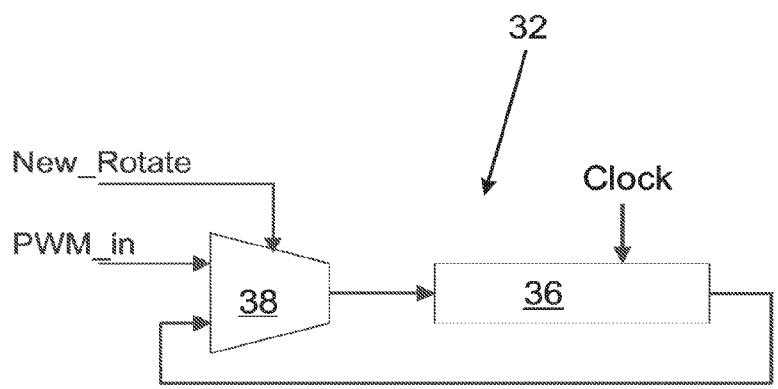
FIG. 4 shows a symbolic diagram of a PWM driver unit from the lighting unit of FIG. 3.

The PWM-controller 32 controls the bypass switch 24 according to a pulse-width modulation sequence. The operation of PWM-controller 32 is symbolically shown in FIG. 4. A PWM-sequence is given as a digital value in a shift register 36. Shift register 36 is continuously bitwise cycled through according to a delivered clock pulse. Operation of bypass switch 24 is, e.g., determined by the least significant bit of register 36 (1=off, 0=on).

A switch 38 may be switched by a signal New_Rotate to selectively connect one of its inputs to its output. If signal New_Rotate is low, PWM-generator 32 is in "rotating PWM" mode, continuously cycling through the value of shift register 36. If New_Rotate is high, a new digital value PWM_in will be loaded into shift register 36. The digital value of shift register 36 determines operation of LED 22. If, for example, shift register 36 holds a 4-bit sequence, a PWM_in value of 1111 would lead to the LED being continuously operated (bypass switch 24 continuously open). In the same way, 0000 would lead to LED 22 being continuously switched off (bypassed), and 0101 will lead to LED being consecutively switched on and off according to the clock pulse so that—at a sufficiently high clock frequency—it will be perceived to operate at about 50% intensity. In this way, the effective intensity of LED 22 is controlled by main controller 30. Other implementations of a PWM controller, making use of e.g. a counter circuit, can be beneficially used as well.

Figure 5:
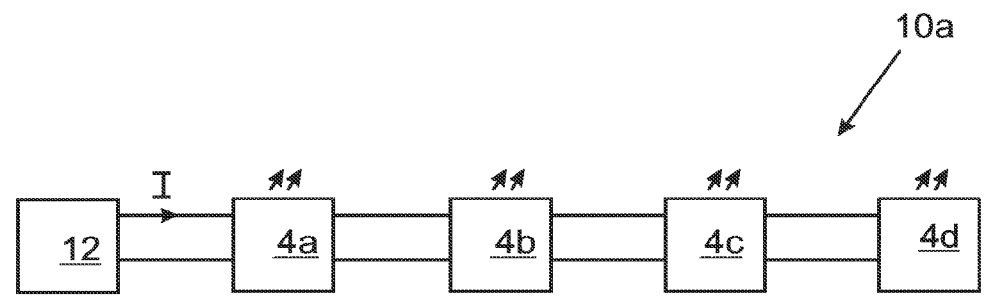
FIG. 5 shows a first example of a topology of a lighting system, where lighting units are arranged in a chain.

FIG. 5 shows a first example of a topology of lighting system 10a. In this example, four lighting units 4a, 4b, 4c, 4d are arranged in a chain configuration. Note that each lighting unit 4a-d in this case is shown to have four terminals. However, lighting units 4a-d still correspond to the circuit diagram of FIG. 3, only with shortcut output terminal $I_{sc}$ shown at both sides on the bottom (through connection).

In the lighting system 10a of FIG. 5, the first lighting unit 4a is connected directly to the current source 12. Further lighting units 4b-4d are then connected consecutively, each to the preceding lighting unit. This example illustrates the minimal wiring outlay. There are no wire connections from the current source 12 to each individual lighting unit. In this way, lighting system 10a may very easily be installed. Also, the configuration may easily be changed, e.g. by adding further units, at any position in the chain.

Figure 6:
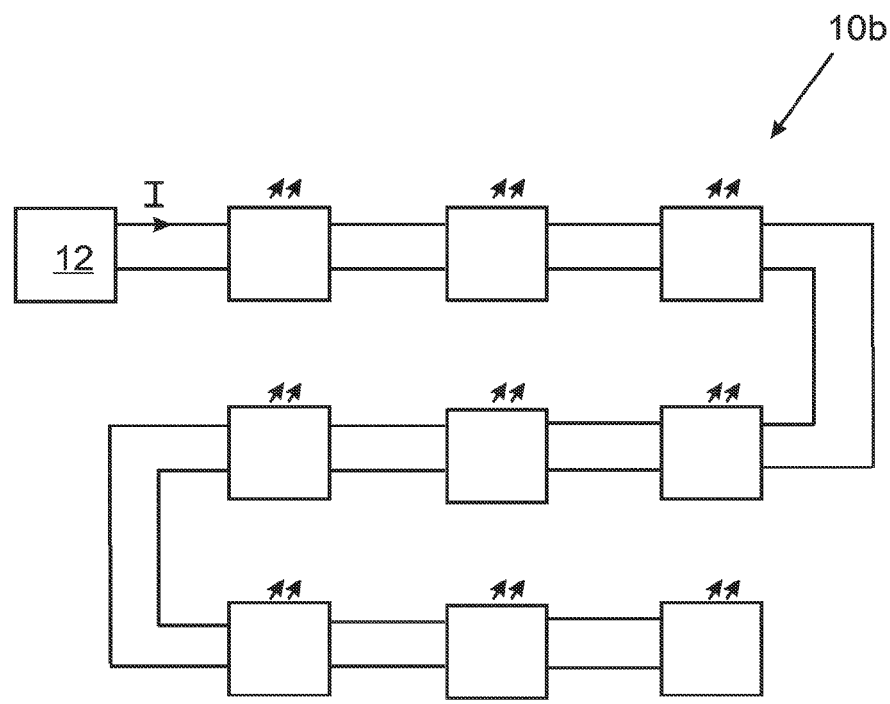
FIG. 6 shows a second example of a topology of a lighting system, where lighting units are arranged as a matrix.

As a further example, FIG. 6 shows a lighting system 10b with nine lighting units, which are serially/consecutively connected in the same way as in the preceding example. However, while in a first example the lighting units are spatially arranged in a line, the lighting units of the second lighting system 10b are arranged in matrix form. However, electrically, the lighting units in the matrix 10b still form a serial connection, with the rows of the matrix being arranged consecutively.

Naturally, there are many further special arrangements possible, also with a higher number of lighting units, such as 10, 20, 50 or more. In each case, however, the lighting units are arranged such that their light sources electrically form a series connection (as long as the shortcut/forward switch is in a forward position, as will become apparent in the following description to be the normal operation mode). Only the last lighting unit in the series connection closes the chain by connecting $I_{sc}$ to $I_{in}$.

In operation phase, the common, essentially constant current I flows through each module. The operational state of each LED, i.e. if it is lighted/turned on or not, is determined by the individual bypassing switches. In this way, under control of the individual control units, any constant or time-variant lighting pattern may be displayed by the spatially distributed lighting units of the lighting systems 10a, 10b. In the following, it will be explained how the lighting systems 10a, 10b are operated to display desired lighting patterns or sequences under control of the system control unit 16 in the current source 12.

As already explained, current source controller 16 may modulate the current I supplied by the current supply. This modulation is used to send configuration and control data to the individual control units 26 in the lighting units 4, 6, 8, so that LEDs 22 are operated in accordance with a desired pattern or sequence. Since, as explained, the current I is the same in all lighting units, the control messages sent by means of modulation on the current I correspond to communication on a shared medium. Consequently, there needs to be some type of addressing to ensure that the desired pattern or sequence is supported in a suitable way by any particular lighting unit. While addresses could be assigned to the lighting units in numerous ways, e.g. pre-programmed during manufacture, according to the preferred embodiment the commissioning, i.e. assigning of addresses, is done automatically following the order of the units in the series connection. The benefit of this automatic address assignment process is that no a-priori knowledge about the number and order of lighting units in a chain needs to be present at manufacturing time.

As shown in FIG. 3, the control unit 26 (or, more specifically, its main controller 30) receives a measurement of the current $I_{in}$ to be able to receive and decode the modulated data.

For automatic commissioning, there are a number of symbols defined, corresponding to characteristic modulation sequences. These symbols, if contained in the modulation of current $I_{in}$, will be recognized by control units 26. In the present example, we will define two symbols, namely ID_start, indicating the start of an identification period, and ID_end, indicating the end of this period. These symbols may be more or less arbitrarily chosen modulation sequences. These should be chosen such that they have a uniquely recognizable pattern, especially different from the address sequences sent during the identification period. Moreover, it is preferred to use these symbols for synchronizing the clocks 34 of the control modules 26 of all lighting units 4, 6, 8, and creating a common understanding about the position of the time slots. The corresponding sequence should have good synchronizing quality w.r.t. the required timing accuracy, i.e. time slots must be identifiable with high confidence during all configuration steps for the entire lighting system.

In the following examples, modulation is effected (according to the embodiment shown in FIG. 2 with a modulation switch 20) by interrupting the current (I=0, corresponding to a digital value of 0) or by leaving the current at its nominal value ($I=I_N$, corresponding to the digital value 1). As already mentioned, there are other, more beneficial types of modulation possible; nevertheless, on-off-switching is chosen for simplicity of drawings and explanations.

Figure 7:
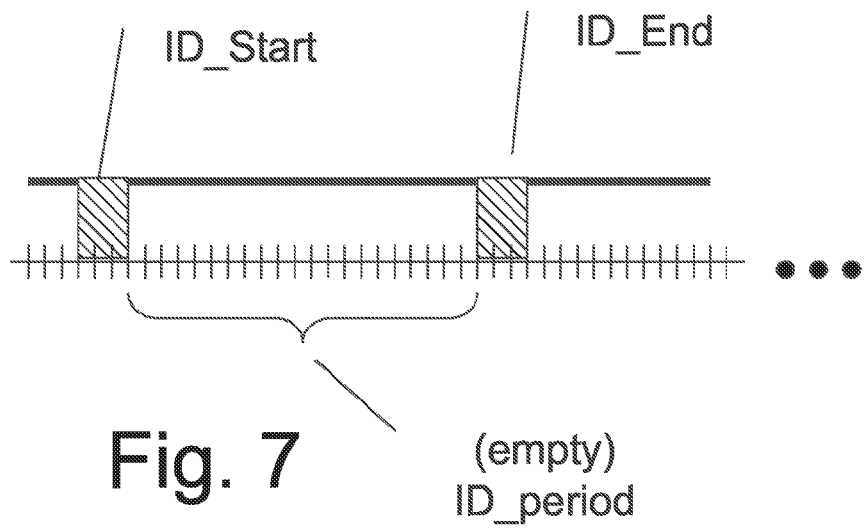
FIG. 7 shows a symbolic timing diagram showing current over time during configuration of a lighting system according to a first embodiment.

FIG. 7 shows a symbolic representation of current I as offered by the intelligent current source over time during the commissioning phase. The time axis is divided into equidistant time slots. Symbols ID_start and ID_end are represented as blocks, which in the figures comprise three time slots. In an actual embodiment, these symbols will preferably be longer to ensure that they are indeed uniquely recognizable.

Figure 8:
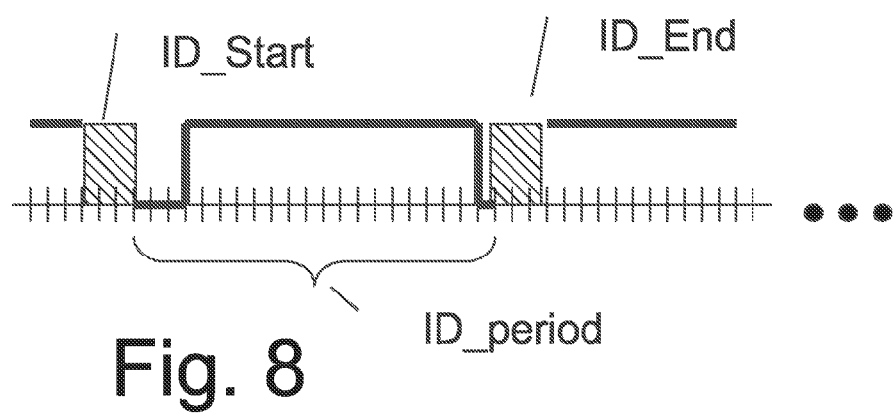
FIG. 8 shows a symbolic timing diagram according to FIG. 7 showing current over time as observed by the fourth lighting unit in a series connection.
Figure 9:
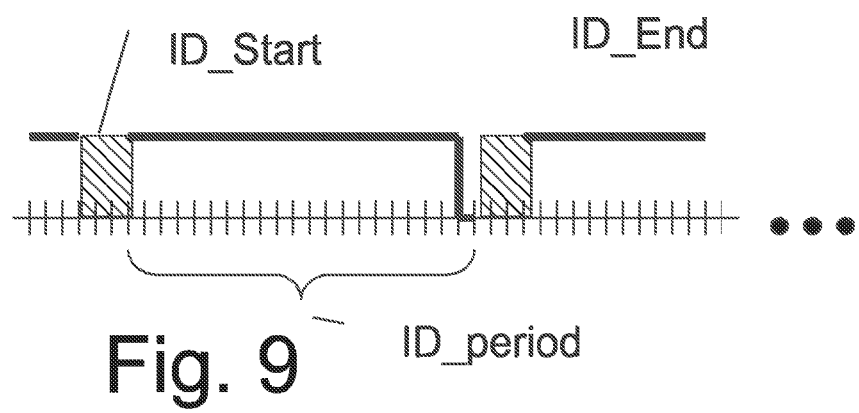
FIG. 9 shows a symbolic timing diagram according to FIG. 7 showing current I over time as observed by the current supply.

FIG. 7-FIG. 9 illustrate a first embodiment of an automatic commissioning method. For commissioning of the lighting units 4, 6, 8 of lighting system 10 (FIG. 1), the current source controller 16 (FIG. 2) modulates the current I as shown in FIG. 7 to include symbols ID_start and ID_end. During the ID_period between these symbols, current I is continuously offered by the current source 14 ($I=I_N$).

Before the commissioning phase starts, all lighting units 4, 6, 8 are operated so that short cut/forward switch 36 is in the upper, forward position, i.e. $I_{in}$ is connected to $I_{fwd}$, and all lighting units receive current. Cable connection 13 is in place as shown in FIG. 1. The intelligent current source connects $I_{fwd}$ of the last lighting unit in the row 8 to $I_{back}$ thereby creating a closed current loop and terminating the electrical connection of the row of lighting units 4, 6, 8. Thus, the current I initially flows through all lighting units 4, 6, 8, and is measured by all main controllers 30 of the individual lighting units.

As soon as the current source 12 issues, and the control unit 26 of the lighting units 4, 6, 8 receive the ID_start symbol, the units 4, 6, 8 enter the commissioning mode. The light units derive the clock synchronization signal (i.e. slot length and beginning) from the ID_start symbol and start counting the time slots. In the commissioning mode, the control units 26 of the light units 4, 6, 8 set shortcut/forward switch 36 to lower, shortcut position, to connect $I_{in}$ to $I_{sc}$, thereby disconnecting the forward terminal $I_{fwd}$. The intelligent current source now opens its internal connection between $I_{back}$ and $I_{fwd}$ of the last lighting unit in line; as will be obvious later, this is necessary in order to allow the intelligent current source and the lighting units to properly detect the end of the commissioning process and the number of lighting units in the chain by observing the current interruption caused by the last lighting unit switchting $I_{in}$ to $I_{fwd}$.

This leaves all lighting units 6, 8, except for the first one in the row 4, disconnected from the current I. While the units are un-powered, control units 26 will continue to operate, due to either sufficient buffering or a fractional (remaing) current, as described above.

The first lighting unit 4 will observe an input current $I_{in}$ as shown in FIG. 7, which is continuously 'on' during the ID_period. Especially, it will observe that during the first time slot, the current $I_{in}$ is on. From this, the control unit 26 of the first lighting unit 4 will deduce that it is first lighting unit in the row, and thus determine a corresponding address off, e.g. #0001$_2$. This address is stored in the memory of main controller 30. After storing the address, commissioning is complete for the first lighting unit 4, and time slot 2 starts. At the beginning of time slot 2, control unit 26 sets shortcut/forward switch 36 to forward position to connect $I_{in}$ to $I_{fwd}$, thereby connecting the second lighting unit to the supply current I. Reception, decoding, processing and storing is effected fast enough within the first time slot. Switching of shortcut/forward switch 36 is then effected at the start of the second time slot.

Thus, the second lighting unit in the row 6 will notice that it does not receive supply current in the first time slot. However, it will notice that in the second time slot, current I is received. This enables the second lighting unit 6 to deduce that it is connected in second place, and thus receives address #$0010_2$. Again, after commissioning of second lighting unit 6 is completed (at the end of second time slot), the second lighting unit 6 also enables the $I_{fwd}$ output, thereby reconnecting the following lighting units 6. This continues on for all lighting units 4, 6, 8.

FIG. 8 shows, as a further example, current I over time as received by the fourth lighting unit in a system comprising 20 lighting units (thus, 20 time slots are shown). The current during the first three time slots is 0. The presence of a current in the fourth time slot leads to an address of #$0100_2$.

This continues on, until the last lighting unit in the row 8 is configured. This lighting unit 8 then puts its forward shortcut switch 36 into forward position at the end of its time slot. Because there is no lighting unit 6 to follow, there is no closed current loop any more. Thus, after time slot 20, the current is interrupted, as indicated in the time slot immediately before the ID_End symbol; in fact, the intelligent current source is triggered by the current interruption to create the ID_End symbol. In an alternative embodiment, no ID_End symbol is used, and simply the interruption of the current after commissioning of the last lighting unit in the line is interpreted as the "end symbol".

FIG. 9 shows current I over time as observed by the intelligent current supply 12 (again, for the example of a system comprising 20 lighting units). The current supply 12 notices the open current loop and thus determines that the ID_period is finished. From the number of the first time slot in which the current flow is interrupted the number of lighting units 4, 6, 8 in the line is calculated. All the light units 4, 6, 8 also observe the current interruption. If necessary, it is also possible in the same way for all lighting units to learn the total number of lighting units in the line. In the present example, it is assumed that 20 lighting units 4, 6, 8 are present. Consequently, the ID_period comprises 20 time slots.

Observing the current interruption, at the end of the last time slot (the one with no current flow), the last lighting unit in the row 8 switches its forward shortcut switch 36 to shortcut mode, thus closing the current loop again and allowing for further communication.

At the end of the ID_period, the intelligent power supply 12 sends the ID_end symbol. Each lighting unit 4, 6 (except for the last one 8) switches its forward shortcut switch 36 into forward mode preparing for normal operation.

Note, that in normal operation cable 13 is no longer needed. The current loop is closed by the last unit 8, which connects I in to $I_{sc}$.

The described first embodiment of an automatic commissioning method is easy to implement. Commissioning is done quickly in only one ID_period.

This commissioning process is started by an application running on the controller 16 of the intelligent current source 12, or a host controller connected to this, whenever this is required: During initial setup, whenever lighting units 4, 6, 8 have been added or removed, or some re-ordering has taken place.

Figure 10:
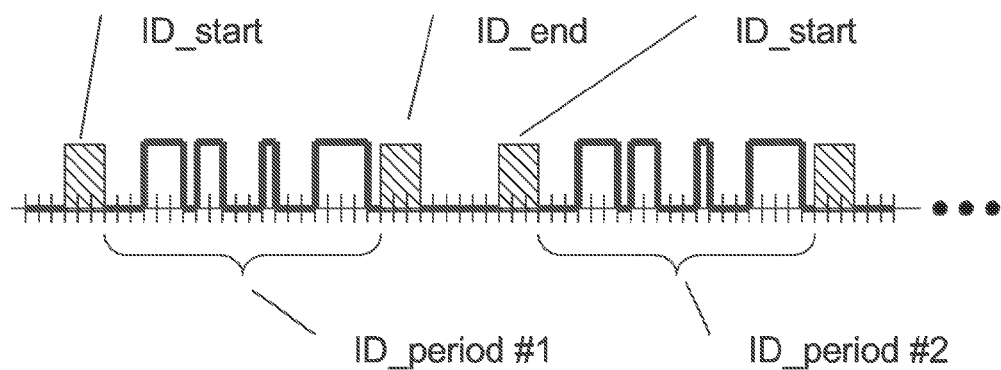
FIG. 10 shows a symbolic timing diagram showing current over time during a configuration according to a second embodiment.

FIG. 10 illustrates a second embodiment of automatic commissioning method. In contrast to the first embodiment, multiple configuration intervals are foreseen, implemented as a dedicated identification period, each of which is preceded by an ID_start symbol and terminated by an ID_end symbol. Again, each un-commissioned lighting unit 4, 6, 8 enters commissioning mode upon receipt of an ID_start symbol, setting shortcut/forward switch 36 to shortcut mode (lower position), thereby cutting off subsequent lighting units 6, 8.

The intelligent power supply 12 starts commissioning the lighting units 4, 6, 8 by sending modulated data as shown in the example of FIG. 10 in multiple identification periods ID_period. However, since multiple ID_periods occur, a "protocol bracket" around the sequence of ID_periods in the form of a COM_start (commissioning start) and a COM_end (commissioning end) symbol is required. The COM_start symbol is issued in advance of the first ID_start symbol.

As a consequence of the commissioning mode, only the first lighting unit 4 in the line remains powered during the ID_period #1 and can receive a unique identifier conveyed during the ID_period #1 in modulated form. The intelligent current source keeps track of the number of lighting units already configured, and sends, together with the ID number, the position of a certain lighting unit in the line to the lighting unit under configuration. Thus, the first lighting unit 4 assigns itself as the logically first lighting unit in the row and stores the received ID data as its own address. At the end of ID_period #1, the just configured lighting unit 4 switches back its forward/shortcut switch 36 to forward mode. This ensures that all the configured lighting units 4, 6 are operational immediately after they have been configured: all configured lighting units have their switches 36 in the forward mode, whereas all un-configured lighting units have their switches 36 in the shortcut mode.

If after the first ID_end symbol also the COM_end symbol is issued by the intelligent current source, then all nodes set their switch 36 into forward mode, and the intelligent current source ensures that the current loop is closed by internally connecting the $I_{back}$ input with $I_{sc}$ from the last lighting unit in the row.

In a subsequent second identification period, the already configured lighting unit 4 ignores the ID_start symbol and leaves its forward/shortcut switch 36 in forward mode (upper position). These ID_periods may immediately follow one after each other, or may happen within separate commissioning phases, i.e. separated by a COM_end and a COM_start symbol. During the second identification period ID_Period #2, all the un-configured lighting units (i.e. all lighting units in the line except for the first lighting unit) still have their forward/shortcut switch 36 in shortcut mode (lower position), cutting off all subsequent lighting units in the line. Since the first lighting unit 4 is already configured, it just behaves passively during all following identification periods, passing the current through. The second lighting unit decodes the identifier conveyed from the intelligent current source 12 during ID_period #2, and stores it as its address, and also stores the position number conveyed by the intelligent current sources as its position number.

As an alternative to the COM_start and COM_end mechanism, un-configured lighting units may also return to their initial state after a time-out period has elapsed, i.e. after a certain period of time, they operate their switch 36 into forward mode.

This goes on with a dedicated ID_period per every lighting unit 4, 6, 8 in the line.

When the last lighting unit 8 has been configured, in the next ID_period also the last lighting unit puts its forward/shortcut switch 36 into forward position. Because there is no lighting unit to follow, there is no closed current loop any more, thus there is no current flow. This condition can be observed in the intelligent current source 12, as well as all lighting units 4, 6, 8, such that the commissioning process is finished. The intelligent current source 12 stores in its memory an addressing table, with logical position in the line (and assigned address) per lighting unit. Also, all of the lighting units may be aware of the total number of lighting units in the line by permanently storing the last address sent before power off and storing the position number sent to the lighting unit configured as last one.

The second embodiment of an automatic commissioning method will usually involve more data being sent from the intelligent current source 12 to the lighting units 4, 6, 8. However, it provides for greater flexibility during commissioning, because a dedicated portion of data of arbitrary length—the data conveyed during the corresponding ID_period—is sent to each lighting unit 4, 6, 8.

Note that the second embodiment of a commissioning method would work even if lighting units cut off from the current supply remain completely un-powered including their control units 26. Only storage of data would need to be non-volatile.

Figure 11:
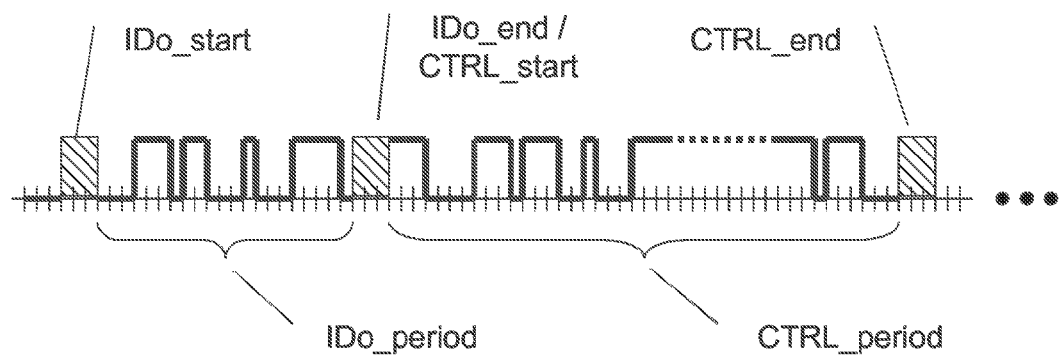
FIG. 11 shows a symbolic timing diagram showing current over time during operation of a lighting system.

During subsequent operation, the assigned addresses may be used to control the lighting system and the individual lighting units 4, 6, 8. For the operation phase, there are further symbols defined, corresponding to pulse sequences. Symbols IDo_start and IDo_end delimit an addressing period IDo_period during the operation phase. Symbols CTRL_start and CTRL_end delimit a control period CTRL_period during the operation phase. Note that IDo_end and CTRL_start may be identical, i.e. a control period immediately follows an addressing period. This is illustrated in FIG. 11.

Control of an individual LED unit, in the example of controlling the brightness level, can be achieved in the following way:

1. The intelligent current source 12 produces a current pattern with an addressing period and a control period as described above. In a simple, preferred example there is only one transition during the CTRL_period; the ON/OFF ratio (duty cycle) of this pattern in the CTRL_period represents the PWM waveform to be used to control the LED unit, which has been addressed in the ID_period.
2. In each lighting unit 4, 6, 8 the main controller 30 detects the IDo_start symbol
3. Next, the main controller 30 compares the incoming ID originating from the intelligent current source 12 with the own ID of the LED module.
   a. If the IDs match, interpretation of the CTRL_period is prepared
   b. If the IDs do not match, the CTRL_period is ignored
4. Next, the main controller 30 waits for the IDo_end/CTRL_start symbol
5. If the ID matched, the Main Controller switches the PWM Controller into the "new PWM" mode via the input selector, and the PWM pattern conveyed within the CTRL_period is stored in the PWM Controller's shift register.
6. Once the CTRL_end symbol is detected, the PWM Controller is switched back to "rotating PWM" mode, and under control of the clock generator 34, the PWM Controller 32 turns the LED on and off periodically, thereby accomplishing a certain brightness level.

A lighting unit 4, 6, 8 keeps its operating state (including the PWM wave form) until a new command is decoded.

The IDo_start, IDo_end/CTRL_start and CTRL_end symbols can be of arbitrary length, and should have a uniquely recognizable pattern. Instead of using a combined IDo_end/CTRL_start symbol, separate IDo_end and CTRL_start symbols can be used.

This above-described first embodiment of a control scheme provides an easy solution for lighting units 4, 6, 8 with a single light source 22, i.e. lighting units with only a single parameter to control.

Next, a second embodiment of a control scheme will be described.

Control of an individual lighting unit 4, 6, 8 having more than one parameter, e.g. the brightness level and the color, can be achieved in the following way:

1. The intelligent current source 12 produces a current pattern with an addressing period and a control period. In this case, the waveform in the CTRL_period represents a command to the LED unit addressed in the associated IDo_period.
2. In each lighting unit 4, 6, 8 the main controller 30 detects the IDo_start symbol
3. Next, the main controller 30 compares the incoming ID originating from the intelligent current source with the own ID of the LED module.
   a. If the IDs match, interpretation of the CTRL_period is prepared
   b. If the IDs do not match, the CTRL_period is ignored
4. Next, the main controller 30 waits for the IDo_end/CTRL_start symbol
5. If the ID matched, the controller receives the command conveyed in the CTRL_period, and stores it (e.g. in a command register within the main controller 30).
6. Once the CTRL_end symbol is detected, the main controller performs the actions associated with this command in the lighting unit 4, 6, 8. These actions may include
   a. Setting brightness, by programming the PWM Controller
   b. Setting the color in the case of a multi-color LED unit
   c. Setting beam parameters in case of variable beamwidth or—orientation LED units
   d. Setting any other suitable lighting unit parameter This second embodiment enables control for lighting units, which have more than a single parameter to control.

The kind and number of controllable parameters is dependent on the type of lighting units creating the line and is assumed to be known to the control application. The order and the length of the parameter-related control signals in the CTRL_period are preferably pre-defined per application.

There are a number of modifications and extensions possible to the preferred embodiments described above:

Group (multicast or broadcast) addresses can be used, e.g. to address multiple (or all) lighting units in the line; for this purpose, a number of pre-defined broadcast addresses (as. e.g. the address #$0000_2$ could be used).

The system could comprise lighting units with multiple LEDs. For multiple-color LEDs, there are basically two design options: Either, the entire module is commissioned as one, and color control is obtained via a suitable control protocol to the lighting units, or each color in the lighting unit is addressed as a separate lighting unit in predefined order, such as e.g. RGBA for red, green, blue and amber.

The forward/shortcut switch could be extended, such that in shortcut mode a high-impedance resistor discharges the un-powered remainder of the LED line. This may reduce the shoot-over voltage induced by the sudden current cut-off.

The commissioning phase could be modified, such that all lighting units 4, 6, 8 keep their forward shortcut switches in the forward position throughout the commissioning. Only the currently commissioned lighting unit switches to shortcut mode, whereby a high-impedance resistor in forward shortcut switch still forwards a fraction of the supply current to the subsequent lighting units, thereby powering the control circuitry in subsequent units. It needs to be ensured, however, that this remaining small supply current is noticeably smaller than the active supply current, in order to allow a lighting unit to recognize whether it is in "powered" state or not.

The system could comprise some sort of back channel, enabling the lighting units to send messages to the intelligent current source 12. For example, the lighting units could send their addresses to the intelligent current source 12 using the same current modulation technique as described above. These may be matched by the controller 16 to the individual lighting units position in the line. Also, the lighting unit could acknowledge receipt of a message from the intelligent current source 12 in this way.

Besides setting static lighting unit parameters (e.g. brightness, color), which will define a light source's behavior until they are changed in a subsequent control period, it is also possible to convey command data corresponding to dynamic, time-variant behavior controlled by the control unit 26 alone, e.g. flashing of the light source. To use this for time-variant patterns, e.g. "chasing lights", it is preferred to have the common cycle period and duration known to all lighting units to achieve synchronization. For example, IDo_period duration or CTRL_period, or a sum of these, could be used as reference timing.

The cable connection 13 from the last lighting unit 8 back to the intelligent current source 12 could be replaced by connecting I in to $I_{sc}$ in the last lighting unit 8. This would allow a closed current loop during commissioning without further wiring outlay. However, then there can be no current interruption at the end of the commissioning phase, so that the end would need to be determined in a different way, e.g. by setting the number of units in advance, or by providing a special type of last unit which signals the end of the commissioning phase.

The invention claimed is:

1. A lighting system, comprising:
   an electrical current supply comprising a system control unit for supplying an electrical current having modulated command data; and
   a plurality of lighting units connected in series to said electrical current supply, each of said lighting units comprising:
      a light source,
      controllable bypassing means for selectively bypassing said light source, and
      a control unit for receiving said modulated command data directed to an address of said lighting unit determined during a commissioning phase, and controlling said bypassing means according to said modulated command data during an operation phase of the lighting system.

2. The lighting system according to claim 1, wherein said bypassing means comprise a bypassing switch connected in parallel to said light source.

3. The lighting system according to claim 1, wherein said control unit comprises a PWM driver unit to control said bypassing means according to a PWM sequence.

4. The lighting system according to claim 1, wherein each of said lighting units further comprises:
   a current input ($I_{in}$),
   a forward current output ($I_{fwd}$),
   a shortcut current output ($I_{sc}$), and
   a switch selectively connecting said current input either to said forward current output or to said shortcut current output,
   wherein the current input ($I_{in}$) of a first lighting unit is connected to said current supply, and the current input ($I_{in}$) of a second lighting unit is connected to said forward current output ($I_{fwd}$) of said first lighting unit.

5. The lighting system according to claim 1, wherein said control unit comprises a clock device for supplying a clock signal, and
   wherein said clock devices of said lighting units are synchronized by said modulated command data.

6. A method for controlling a plurality of lighting units connected in series to an electrical current source for supplying an electrical current, each of the lighting units comprising a light source and controllable bypassing means enabling the light source to be selectively bypassed, the method comprising:
   receiving the electrical current from the electrical current source, the electrical current including modulated data;
   determining address data corresponding to the lighting units based on the modulated data during a commissioning phase; and
   determining control data for controlling the bypassing means of the lighting units during an operation phase using the corresponding address data of the lighting units.

7. The method according to claim 6, wherein each of said plurality of lighting units further comprises:
   a current input ($I_{in}$),
   a forward current output ($I_{fwd}$),
   a shortcut current output ($I_{sc}$), and
   switching means (36) to connect said current input ($I_{in}$) selectively either to said forward current output ($I_{fwd}$) or said shortcut current output ($I_{sc}$),
   wherein said lighting units are connected such that the electrical current is delivered to said current input of a first lighting unit, and the current input of a second lighting unit is connected to said forward current out of said first lighting unit.

8. The method of claim 7, wherein the current input ($I_{in}$) is disconnected from the forward current output ($I_{fwd}$) in each of the plurality of lighting units during the commissioning phase.

9. The method according to claim 8, wherein each lighting unit, after entering said commissioning phase, controls said switching means to connect said current input ($I_{in}$) with said shortcut current output ($I_{sc}$), thereby disconnecting said forward current output ($I_{fwd}$), and
   wherein each lighting unit consecutively receives an input current ($I_{in}$) containing configuration data, and after reception of said configuration data, said switching means is operated to connect said current input ($I_{in}$) to said forward current output ($I_{fwd}$).

10. The method according to claim 9, wherein in said commissioning phase, the address data are received and stored by the corresponding lighting units.

11. The method according to claim 9, wherein each lighting unit further comprises clock means for generating a clock signal, and
    upon reception of a current signal during said commissioning phase, said clock signal in each lighting unit is evaluated to determine said address data.

12. The method according to claim 6, further comprising: storing associated address data in each of the lighting units, wherein the modulation data contains the address data of one or more of said lighting units and the control data directed at said one or more lighting units during the operation phase, and said control unit of said one or more lighting units recognizes said address data and processes said corresponding control data to operate said light source.

13. A lighting system, comprising:
an electrical current supply configured to provide an electrical current including modulated data; and
a plurality of lighting units connected in series to the electrical current supply, each of the lighting units comprising:
   a light source;
   a switch configured to selectively bypass the light source; and
   a control unit configured to receive the modulated data from the electrical current,
wherein the modulated data provides addresses to the plurality lighting units during a commissioning phase and provides control data to the plurality lighting units during an operation phase using the corresponding addresses, respectively, and
wherein the control units control the corresponding switches according to the received modulated data during the operation phase.

14. The lighting system of claim 13, wherein the addresses of the plurality of lighting units correspond to an order of the plurality of lighting units from the electrical current supply.

15. The lighting system of claim 13, wherein each of the plurality of lighting further comprises:
   a current input ($I_{in}$);
   a forward current output ($I_{fwd}$);
   a shortcut current output ($I_{sc}$); and
   a switch configured to selectively connect the current input ($I_{in}$) to one of the forward current output ($I_{fwd}$) or the shortcut current output ($I_{sc}$),
   wherein said lighting units are connected such that the electrical current is delivered to said current input of a first lighting unit, and the current input of a second lighting unit is connected to said forward current out of said first lighting unit.

16. The lighting system of claim 15, wherein each of the plurality of lighting units, after entering said commissioning phase, controls the switch to connect the current input ($I_{in}$) with the shortcut current output ($I_{sc}$), thereby disconnecting the aid forward current output ($I_{fwd}$).

17. The lighting system of claim 16, wherein each of the plurality of lighting units consecutively receives an input current containing the modulated data via the current input ($I_{in}$), and then controls the switch to connect the current input ($I_{in}$) to the forward current output ($I_{fwd}$).

* * * * *